US008833278B2

(12) United States Patent
Isaksson

(10) Patent No.: US 8,833,278 B2
(45) Date of Patent: Sep. 16, 2014

(54) METHOD FOR PROCESSING ASH, AND AN ASH PROCESSING PLANT

(75) Inventor: Juhani Isaksson, Tampere (FI)

(73) Assignee: Valmet Power Oy, Tampere (FI)

(*) Notice: Subject to any disclaimer, the term of this patent is extended or adjusted under 35 U.S.C. 154(b) by 0 days.

(21) Appl. No.: 13/418,786

(22) Filed: Mar. 13, 2012

(65) Prior Publication Data

US 2012/0234217 A1 Sep. 20, 2012

(30) Foreign Application Priority Data

Mar. 14, 2011 (FI) .................................... 20115258

(51) Int. Cl.
F23J 3/06 (2006.01)
F23G 5/30 (2006.01)
F23G 7/06 (2006.01)
C10J 3/56 (2006.01)

(52) U.S. Cl.
CPC ........... *F23G 5/30* (2013.01); *C10J 2300/1606* (2013.01); *Y02E 20/18* (2013.01); *F23G 7/065* (2013.01); *C10J 2300/0946* (2013.01); *C10J 3/56* (2013.01); *C10J 2300/1815* (2013.01); *F23G 2209/30* (2013.01); *F23G 2203/501* (2013.01); *F23G 2202/106* (2013.01); *C10J 2300/1628* (2013.01); *C10J 2300/1861* (2013.01)
USPC ...................................... 110/344; 110/165 A

(58) Field of Classification Search
USPC ............. 110/346, 342, 344, 345, 165 A, 229, 110/216, 243, 244, 245, 210, 234, 233
See application file for complete search history.

(56) References Cited

U.S. PATENT DOCUMENTS

| 3,847,563 | A |   | 11/1974 | Archer et al. |  |
|---|---|---|---|---|---|
| 4,444,568 | A |   | 4/1984 | Beisswenger et al. |  |
| 4,541,345 | A | * | 9/1985 | Grumpelt et al. | 110/229 |
| 5,425,317 | A | * | 6/1995 | Schaub et al. | 110/346 |
| 5,858,033 | A | * | 1/1999 | Hirayama et al. | 110/245 |
| 6,814,011 | B2 | * | 11/2004 | Saccani | 110/233 |

(Continued)

FOREIGN PATENT DOCUMENTS

DE 10 2009 014 410 A1 3/2009
EP 0 062 363 A1 3/1982

(Continued)

OTHER PUBLICATIONS

Extended European Search Report, dated Jul. 24, 2012, from the European Patent Office, issued in connection with counterpart European Patent Application No. 12 39 7507.

(Continued)

Primary Examiner — Kenneth Rinehart
Assistant Examiner — Tavia Sullens
(74) Attorney, Agent, or Firm — Venable LLP; Eric J. Franklin

(57) ABSTRACT

In a method for processing ash, fly ash is separated from a product gas flow obtained from gasification of fuel, which fly ash is burned in fluidized bed combustion to reduce the carbon content of the ash. After this, the flue gases from the combustion are processed. In a first step, the ash is burned in fluidized bed combustion (fluidized bed reactor 1) at a temperature of not higher than 800° C. to reduce the carbon content, and in a second step, the flue gases a burned in an independent combustion process (combustion chamber 7), the combustion conditions reaching the temperature of at least 850° C.

4 Claims, 2 Drawing Sheets

(56) References Cited

U.S. PATENT DOCUMENTS

| | | | |
|---|---|---|---|
| 7,029,273 B2* | 4/2006 | Fung et al. | 110/245 |
| 7,503,945 B2* | 3/2009 | Hiltunen et al. | 48/61 |
| 2007/0199486 A1* | 8/2007 | Saito et al. | 110/344 |
| 2008/0078324 A1* | 4/2008 | Halfinger et al. | 118/715 |

FOREIGN PATENT DOCUMENTS

| | | |
|---|---|---|
| FI | 990133 | 7/2000 |
| JP | 54064502 A | 5/1979 |
| JP | 11294744 A | 10/1999 |
| WO | WO 00/43468 | 7/2000 |
| WO | WO-00/43468 | 7/2000 |
| WO | WO-03/055962 A1 | 7/2003 |
| WO | WO-2006/123018 A1 | 11/2006 |

OTHER PUBLICATIONS

Non-English Finnish Office Action—Nov. 12, 2013 (Issued in counterpart Application No. 20115258).

Finnish Office Action—Jan. 26, 2012.

* cited by examiner

METHOD FOR PROCESSING ASH, AND AN ASH PROCESSING PLANT

FIELD OF THE INVENTION

The invention relates to a method for processing ash. The invention also relates to an ash processing plant.

BACKGROUND OF THE INVENTION

One way of producing fuel is to gasify a carbonaceous raw material, wherein it becomes gas which can be burnt. Particularly popular raw materials include waste materials which are normally organic materials, such as various types of wood waste and package waste (for example, cardboard and paper). The material is also called recovered fuel.

The gasification normally takes place in a fluidized bed process at a high temperature under air-deficient conditions. The product gas obtained is suitable to be burned in, for example, a conventional power plant boiler.

Before its burning, the product gas produced in gasification has to be purified by removing various solids and other impurities. So-called fly ash separated from the product gas contains most of the heavy metals, chlorine and alkali metals of the raw material. The composition of the ash will depend on the raw materials gasified.

The ash contains soluble components which make it hazardous waste. Disposal sites are provided for ash fraction classified as hazardous waste. However, the ash obtained in purifying the gas produced by a gasifier has a high content of soot (10 to 40%) which complicates the final disposal of the ash, because the carbon content exceeds the allowed limit. Such ash can be subjected to special treatment at a hazardous waste disposal plant, but this is relatively expensive.

Finnish patent FI 110266 discloses a method for treating soot-containing solids of the product gas from gasification already at the gasification plant. In this method, ash having a high soot content and being separated from the product gas flow is introduced in a fluidized bed reactor acting as an oxidizer where it is burnt at a temperature of 800 to 900° C. to oxidize the carbon to carbon dioxide. The combustion flue gases are redirected as secondary gasification gas to the gasifier. Before this, ash is separated from the flue gases.

However, such a solution to recirculate the flue gases is problematic, because the additional gas flow from the oxidization is rich in oxygen, which makes the control of the gasification process more difficult. Also, the capacity diminishes, because part of the capacity is taken by the flue gas flow which increases an inert flow through the gasifier.

SUMMARY OF THE INVENTION

It is an aim of the invention to present a method for processing ashes rich in soot but simultaneously for final processing of the flue gases produced by desooting (removal of carbon residues).

In the invention, the fly ash separated from the product gas of gasification is oxidized by fluidized bed combustion at a temperature of not higher than 800° C., and in a second step, the gases produced by fluidized bed combustion are burned at a temperature of at least 850° C. in an independent combustion process, for example in a separate combustion chamber.

By means of the invention, the soot content in the gasification ash can be reduced to an allowable level without decomposing the chlorine compounds in the ash, and after the separation of the ash, the remaining gas can be burned at a high temperature under conditions required by the waste directives. The chlorides are not evaporated at the relatively low temperature of the fluidized bed combustion, but they are removed with the ash. The ash can be processed independently of the gasification process, for example when the gasification process is not running. Furthermore, the gasification process and the ash treatment process can be adjusted irrespective of each other.

BRIEF DESCRIPTION OF THE DRAWINGS

In the following, the invention will be described in more detail with reference to the appended drawings, where.

DESCRIPTION OF THE PREFERRED EMBODIMENTS

The gasification process is known as such, and it will not be described in more detail. The raw material is normally so-called recovered fuel which includes various types of municipal waste and industrial waste, normally solid carbonaceous fuel suitable for energy production.

Figure 1:
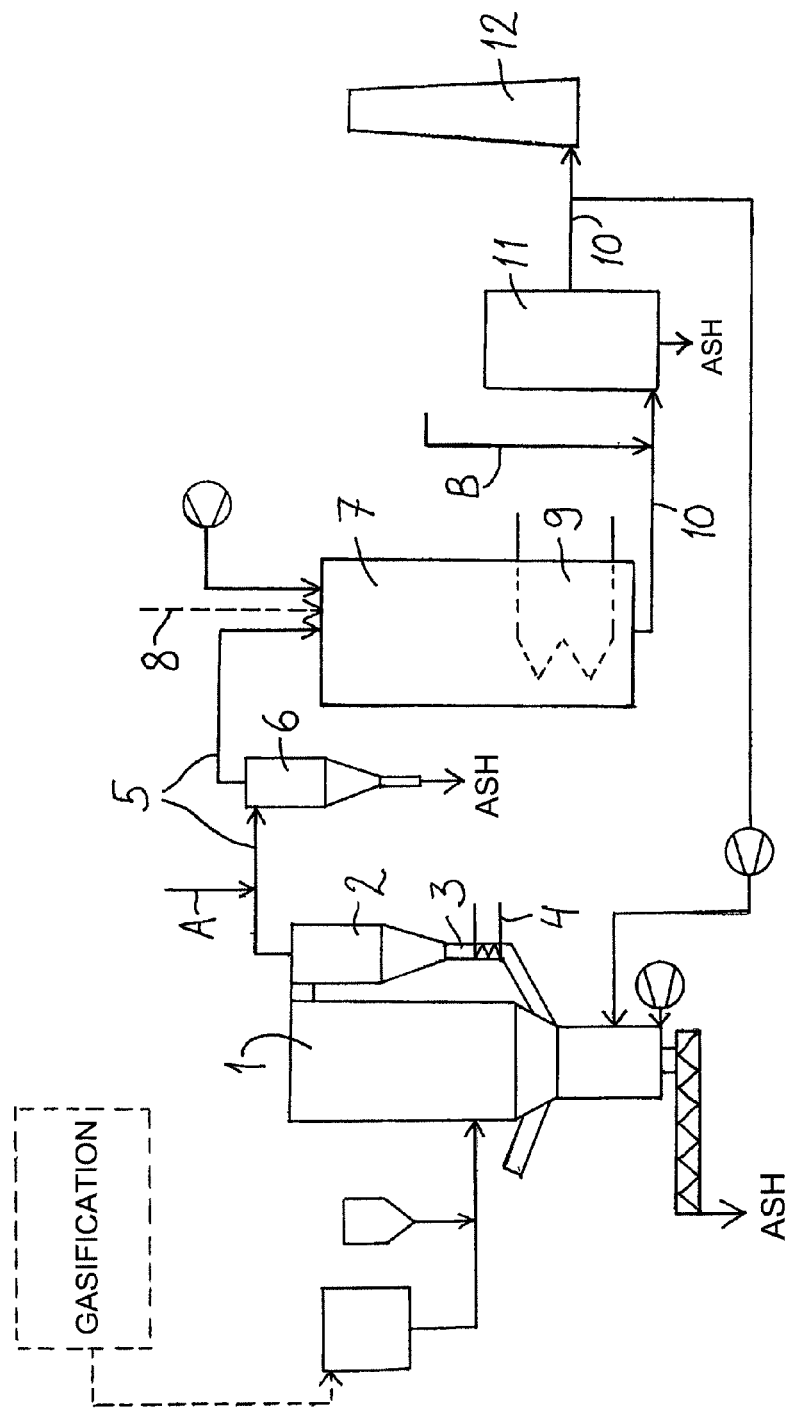
FIG. 1 is a process chart of an ash processing plant.
Figure 2:
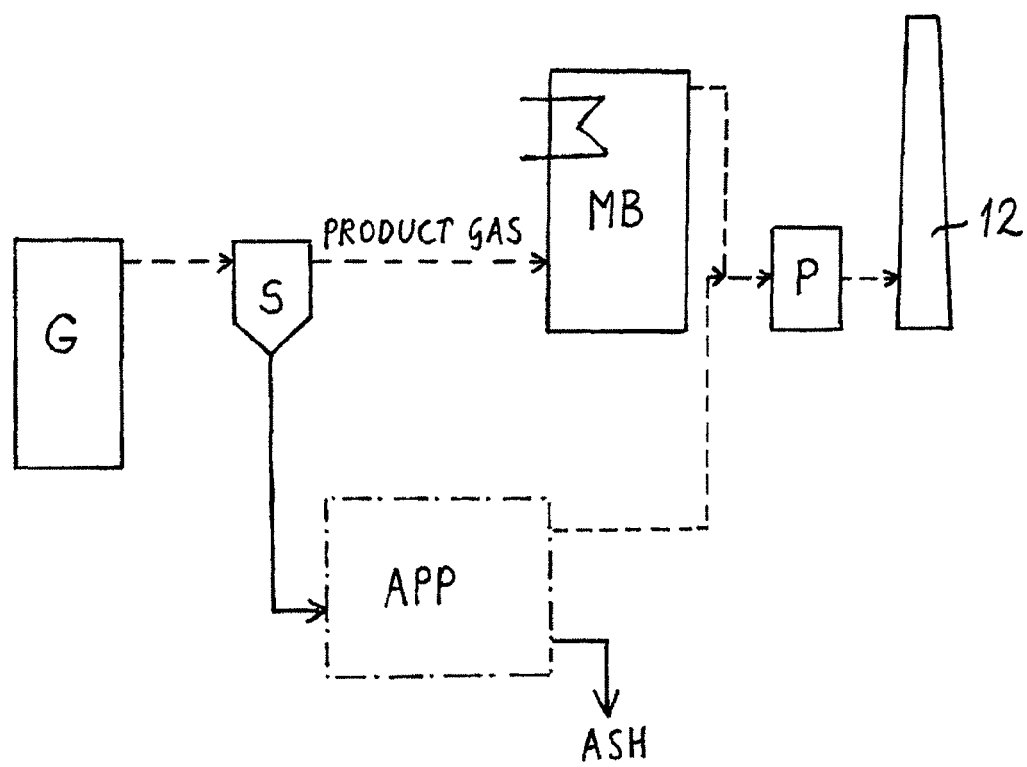
FIG. 2 shows the ash processing plant in a power plant.

The hot fly ash separated from the flow of combustible product gas obtained from the gasification of the fuel is processed in a plant shown in FIG. 1. Normally, such a plant is located in the same power plant as the gasifier itself and the main boiler of the power plant for combustion of the product gas, to produce energy, as is shown in FIG. 2. In FIG. 1, the gasification process and the ash separated from it and supplied as raw material for the plant is illustrated with broken lines. This ash, having a high content of unreacted carbon in the form of soot that originates in the gasified fuel, is introduced with additional fuel into a fluidized bed reactor 1, in which the combustion takes place by means of oxygen-containing air supplied into the reactor. Additional fuel is not necessarily needed, but the temperature required by the combustion can be reached solely by the combustible carbon contained in the ash. The fluidized bed reactor also contains solid bed material (sand, limestone, or the like), which can be added, if necessary. The fluidized bed reactor 1 is a circulating fluidized bed reactor with a return circulation for the bed material, formed by a cyclone 2 and a return pipe 3. The reactor is operated with air deficiency to reach an oxidation temperature between 600 and 800° C. Advantageously, the oxidation temperature is about 720° C.

The furnace of the reactor 1 is fully refractory-lined (thermally insulated); in other words, it does not contain heat transfer surfaces which would absorb combustion heat. In the return circulation of bed material, it is possible to use a heat exchanger 4 for adjusting the oxidation temperature.

In the case of FIG. 1, the fluidized bed reactor is a circulating fluidized bed (CFB) reactor. A bubbling fluidized bed (BFB) can also be used, if the ash can be made sufficiently coarse.

The coarser fraction of the ash is removed from the reactor 1 from below, in the form of bottom ash, and the finer fraction which is not separated in the cyclone 2 to the return circulation, is carried with the flue gases along a flue gas duct 5 to an ash separator 6 (cyclone) where it is separated, and the flue gases are led to a combustion chamber 7. In the combustion chamber, the gases are burned at a higher temperature which is momentarily (for at least 2 s) at least 850° C., measured at the flue gases, to achieve the conditions according to the waste incineration directive (WID). If necessary, support fuel, which may be natural gas or oil, is introduced into the combustion chamber 7 along a line 8. In the power plant, the combustion chamber 7 is an independent unit, separate from the main boiler, and the flue gases produced by it are discharged in the air after their purification.

Downstream of the combustion chamber 7, the flue gases are led into a flue gas boiler 9 where they are cooled by means of a heat transfer medium (for example, water or water vapour flowing in pipes). The flue gas boiler 9 may be integrated in the same boiler as the combustion chamber 7. The cooled flue gases are led along a conduit 10 to a final gas filter 11 which is a bag filter. At the end, there may also be other gas purification devices, such as a catalyst (for example $NO_x$ catalyst). The purified flue gases are led into a chimney 12 or the chimney of the main boiler of the power plant, or to a suitable point in the back pass of the main boiler. The flue gases of the ash processing plant and the flue gases of the main boiler of the power plant may also have common gas purifiers, wherein the gas is led along the conduit 10 to a suitable point in the back pass of the main boiler. Also, the gas filter 11 can be replaced by the filter of the main boiler.

After the fluidized bed combustion in the combustion chamber 7, carbon residues in the ash constitute preferably less than 5 wt-% calculated on the basis of the amount of total fly ash separated from the product gas flow.

The chart also shows the supply of auxiliary agents both into the flue gas duct 5 upstream of the ash separator 6 (arrow A) and into the conduit downstream of the cooler, upstream of the gas filter 11 (arrow B). These auxiliary agents may consist of solids with a coarser particle size than the particle size of ash to be separated, to facilitate the separation of ash.

FIG. 2 shows the location of the ash processing plant APP of FIG. 1 in the power plant with integrated gasification of recovered fuel in a gasifier G. In the chart of FIG. 2, the gas streams are denoted with broken lines and the ash streams with solid lines. Fly ash is separated in a separator S from the flow of product gas issuing from the gasifier G and it is introduced as combustible fuel to the main boiler MB where it is burned for producing energy. The flue gases of the ash processing plant are introduced to the flue gas channel of the main boiler MB before the flue gas purifier P and the chimney 12 of the power plant. In this case the flue gas purification process of the main boiler MB is also used for the purification of the flue gases issuing from the ash processing plant APP.

What is claimed is:

1. A method for processing ash, the method comprising:
    separating fly ash from a product gas flow obtained from gasification of fuel,
    burning the fly ash separated from the product gas flow in fluidized bed combustion at a temperature of not higher than 800° C., to reduce the carbon content in the fly ash, said burning of the fly ash, in fluidized bed combustion producing flue gases,
    burning the flue gases in combustion conditions in an independent combustion process separate from a main boiler of a power plant that burns the product gas flow, wherein combustion conditions of the independent combustion process reach a temperature of at least 850° C.
    collecting gas issuing from said independent combustion process as a result of burning the flue gases and
    purifying said collected gas together with flue gases from the main boiler of the power plant, in at least one purification step.

2. The method according to claim 1, wherein before the combustion process, fine ash material entrained in the flue gases of the fluidized bed combustion is separated from the flue gases.

3. The method according to claim 1, wherein the fluidized bed combustion takes place in a circulating fluidized bed.

4. The method according to claim 1, wherein after the fluidized bed combustion, carbon residues constitute less than 5 wt % of the amount of total fly ash separated from the product gas flow.

* * * * *